(12) United States Patent  
Narayanasamy

(10) Patent No.: US 8,171,253 B2
(45) Date of Patent: May 1, 2012

(54) VIRTUAL DISK MAPPING

(75) Inventor: Senthilkumar Narayanasamy, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 397 days.

(21) Appl. No.: 12/609,133

(22) Filed: Oct. 30, 2009

(65) Prior Publication Data

US 2011/0107052 A1 May 5, 2011

(51) Int. Cl.
*G06F 12/00* (2006.01)
(52) U.S. Cl. .................................................. 711/203
(58) Field of Classification Search ................... None
See application file for complete search history.

(56) References Cited

U.S. PATENT DOCUMENTS

| | | | |
|---|---|---|---|
| 6,857,059 B2 * | 2/2005 | Karpoff et al. ............... | 711/209 |
| 7,386,700 B2 * | 6/2008 | Lasser ........................ | 711/202 |
| 7,941,632 B2 * | 5/2011 | Karpoff et al. ............... | 711/209 |
| 2006/0064441 A1 * | 3/2006 | Yamamoto .................. | 707/201 |
| 2008/0307191 A1 * | 12/2008 | Lane et al. ................... | 711/209 |

* cited by examiner

*Primary Examiner* — Hiep Nguyen
(74) *Attorney, Agent, or Firm* — Wong, Cabello, Lutsch, Rutherford & Brucculeri LLP

(57) ABSTRACT

A storage area network can include a storage virtualization entity—intelligent storage application resource (iSAR)—either as a separate device in the fabric, or as an integrated module in one or more switches within the fabric. All I/O operations can be re-directed to iSAR for processing. iSAR can segment virtual storage and physical storage into units, where each unit of the virtual storage is mapped to a single unit in physical storage. Data associated with incoming I/O operation can be compressed before being stored in physical storage. iSAR includes overflow reserve storage at the block, sub-page and page level to accommodate changes in compressed data size on subsequent I/O operations. These measures can improve I/O performance and reduce fragmentation. iSAR can also employ deduplication of incoming data stored on physical storage to improve storage efficiency.

28 Claims, 11 Drawing Sheets

VIRTUAL DISK MAPPING

BACKGROUND OF THE INVENTION

1. Field of the Invention

The present invention relates generally to networking, such as storage area networking or cloud computing or converged data networks. Particularly, the present invention relates to storage virtualization.

2. Description of the Related Art

The storage industry has seen almost exponential growth in requirements for storage capacity over the last few years. Although the cost of storage has fallen considerably, administrative and management costs associated with maintaining large quantities of storage has risen considerably. Migration from direct attached server centric storage to storage networks (e.g., SAN) has addressed some complexities of storage management; however, storage networks have proved adequate or efficient only for smaller environments. Storage virtualization in storage networks potentially offers mechanisms for managing large quantities of data over large networks.

Storage network virtualization helps moving storage virtualization functions from servers (e.g., volume manager, file system) and disk subsystems (e.g., RAID, remote mirroring, LUN masking) into the storage network. This creates a virtualization entity which, as a result of its positioning in the storage network, spans all servers and storage systems. Virtualization in the storage network permits full utilization of the potential of storage network with regard to efficient use of resources and data, the improvement of performance, and protection against failures.

Virtualization inserts a abstraction layer between storage devices and storage users. This forms an interface between virtual and physical storage by mapping virtual storage to physical storage and vice versa. Storage is separated into physical implementation level and a logical representational level by abstracting the physical storage to logical storage by aggregating several physical storage devices to form one or more logical (virtual) storage units. Applications on servers connected to the storage networks interface with one or more virtual disks for their I/O operations. The virtualization entity hides the complexities of storage units by translating the incoming I/O operations on the virtual disk into I/O operations on physical storage units. The virtualization entity maintains all translation information (e.g., mapping) for efficient and seamless access of storage data.

FIG. 1 shows a virtual disk vDISK 101 mapping to a physical disk pDISK 103 using thin provisioning. Logical virtual memory blocks are mapped to physical memory blocks in the pDISK 103. Virtual memory blocks 105, 107, etc., can be of fixed or variable size. For example, block 105 is 4 KB in size, while block 109 is 32 KB in size. The allocation of physical blocks in pDISK 103 is done dynamically, i.e., the storage is allocated on receiving an I/O write operation from an application. By allocating physical blocks on an I/O basis, thin provisioning avoids drawbacks of traditional allocation methods (also called fat provisioning) where pools of physical storage are allocated to individual applications. In fat provisioning, even if the level of utilization of the allocated storage space by the application is low, the allocated space cannot be shared with other applications that require additional storage.

However, thin provisioning suffers from fragmentation, degradation of performance, and large metadata overhead. Because the physical blocks are allocated on an I/O basis, the allocation is scattered over the entire physical storage pool. Fragmentation can result in degraded storage utilization. Further, because of the scattering of data, the performance of a read/write operation may be degraded due to numerous head movements for seeking data spread over a large storage space.

SUMMARY OF THE INVENTION

According to the embodiments of the present invention, performance of storage virtualization is improved.

In one embodiment, a Fibre Channel fabric can include a virtualization entity—intelligent storage application resource (iSAR)—which can be a separate device within the fabric or can be a part of one or more switches in the fabric. The virtualization entity, iSAR, can aggregate several storage units, such as RAID devices, or JBODs to form one or more virtual storage units. The virtual storage units, vDISKs, can be presented to servers and applications running on those servers for their I/O operations. iSAR can also include mapping information for mapping the virtual disk to physical disks.

In one embodiment, hierarchical sparse mapping is used to map the virtual disk to a physical disk. Both the virtual disk, vDISK, and the physical disk, pDISK, can be segmented into units. Hierarchical sparse mapping can map one unit from vDISK to a single unit in pDISK. Logical blocks in one unit in vDISK can be allocated data blocks in the corresponding unit in pDISK. The logical blocks can be stored in pDISK with or without compression. By ensuring that logical blocks from a unit in vDISK are allocated storage in the same unit on pDISK, data fragmentation is reduced.

In one embodiment, the data stream associated with an I/O operation can be segmented into chunks. Fixed size chunking results in chunks with a predetermined size, e.g., 4 KB. Variable size chunking determines chunk boundaries based on bit sequences called "anchors." Chunks can be compressed before being allocated data blocks in pDISK. Overflow reserve storage can be provided at the page and subpage level in pDISK. Therefore, if compressed chunks require more than the previously allocated data blocks, additional data blocks can be allocated from the same subpage or page. This avoids fragmentation of data when data needs to be reallocated due to increase in the size of compressed chunks.

iSAR can also maintain metadata that contains mapping information for each unit in vDISK. Unit metadata can, in turn, include chunk structures that store a logical block address indicating the location in pDISK at which the chunk is stored. The chunk structure can also include a field indicating the number of blocks allocated to the chunk. Metadata can also include a page header that, in turn, includes a page index and a per page block bitmap. The page index can identify pages allocated to any particular unit in vDISK. Per page block bitmap indicates which of the data blocks within each page have already been allocated and which data blocks are free. The metadata can also include a page structure that contains information on the empty/used status of pages in pDISK.

When an I/O operation for a virtual address is received, iSAR needs to bring only the unit metadata associated with that address into processor memory or cache. Because I/O operations can access virtual addresses that are randomly distributed over the vDISK, unit metadata for each of the units encompassing the randomly accessed virtual addresses needs to be stored in memory. The total size of the metadata for one petabyte of vDISK is approximately 256 MB, which can be accommodated with current technology.

I/O operations can request data at addresses that are un-aligned with chunk boundaries. Traditionally this would require a read-modify-write operation, which is time intensive. Instead, iSAR can allocate the incoming un-aligned chunks to temporary storage within pDISK, as if writing new data. During downtime, data in pDISK data blocks where the addressed chunks were originally stored can be decompressed and replaced with the data stored in temporary storage, recompressed, and stored back at the same location in pDISK. As a result, the I/O operation latency for un-aligned chunk boundaries is the same as for aligned chunk boundaries.

iSAR can employ additional mechanisms for compressing the amount of data stored in the physical storage. Deduplication is one such method, which strives to store only a single copy of possibly several duplicate incoming chunks to physical storage. A chunk ID can be generated for each incoming chunk and the chunk ID can be compared with previously stored chunk IDs. If a match is found, then the incoming chunk is not stored to physical storage. The metadata associated with the new duplicate incoming chunk can be modified to point to the location in physical storage where the copy of the chunk is already stored.

In one embodiment the virtualization entity can also be located within the storage devices themselves, instead of being located in the fabric. iSAR can be located at a controller for the storage device. The controller presents the servers virtual volumes and maps the virtual volumes to several physical disks.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 2:
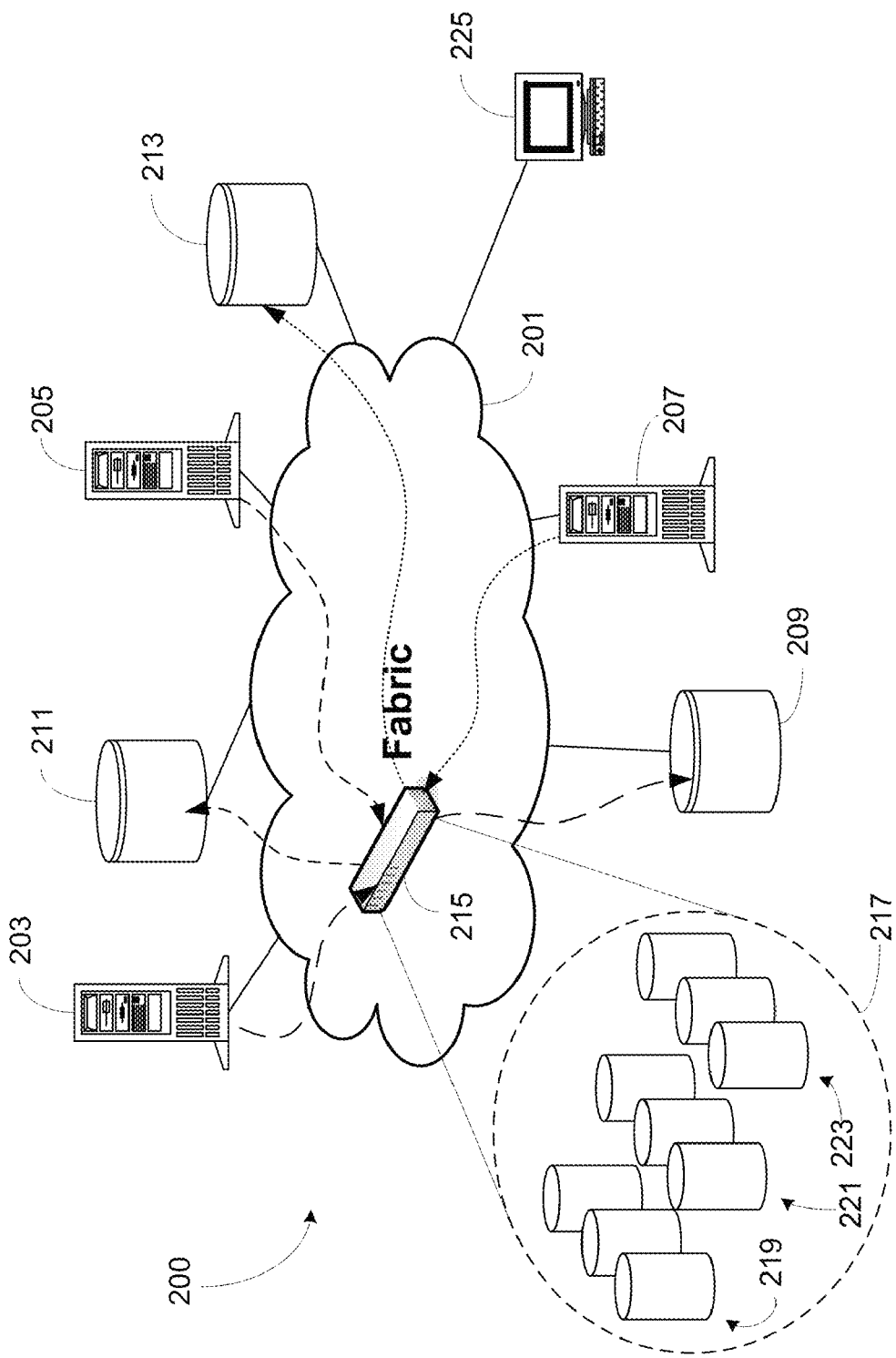
FIG. 2 illustrates a Fibre Channel network communications system including a virtualization entity.

FIG. 2 illustrates a Fibre Channel network 200 including various network, storage, and user devices. It is understood that Fibre Channel is only used as an example and other network architectures, such as Ethernet, FCoE, iSCSI, and the like, could be utilized. Furthermore, the network 200 can represent a "cloud" providing on-demand network access to a shared pool of configurable computing resources (e.g., networks, servers, storage, applications, and services). The network can also represent a converged network such as Fibre Channel over Ethernet. Generally, the network 200 can be connected using Fibre Channel connections. The fabric 201 can include one or more switches interconnected with inter-switch links A variety of devices can be connected to the fabric 201. These devices can be supported by both point-to-point and loop device connections. A point-to-point connection is a direct connection between a device and the fabric. A loop connection is a single fabric connection that supports one or more devices in an "arbitrated loop" configuration, wherein signals travel around the loop through each of the loop devices. Hubs, bridges, and other configurations may be added to enhance the connections within an arbitrated loop.

On the fabric side, devices can be coupled to the fabric via fabric ports. A fabric port (F_Port) can support a point-to-point fabric attachment. A fabric loop port (FL_Port) can support a fabric loop attachment. Both F_Ports and FL_Ports may be referred to generically as Fx_Ports. Typically, ports connecting one switch to another switch are referred to as expansion ports (E_Ports). In addition, generic ports may also be employed for fabric attachments. For example, G_Ports, which may function as either E_Ports or F_Ports, and GL_Ports, which may function as either E_Ports or Fx_Ports, may be used.

On the device side, each device coupled to a fabric constitutes a node. Each device can include a node port by which it is coupled to the fabric. A port on a device coupled in a point-to-point topology is a node port (N_Port). A port on a device coupled in a loop topology is a node loop port (NL_Port). Both N_Ports and NL_Ports may be referred to generically as Nx_Ports. The label N_Port or NL_Port may be used to identify a device, such as a computer or a peripheral, which is coupled to the fabric.

In the example shown in FIG. 2, fabric 201 can be connected to nodes such as servers 203, 205, and 107 and storage devices 209, 211, and 213. Servers 203, 205, and 207 can be email, file, database, etc. servers, and storage devices 209, 211, and 213, can be RAID devices, JBOD (just a bunch of disks) devices, or any device capable of storing data. The fabric also includes iSAR 215 (intelligent storage application resource) that can serve as a virtualization entity. iSAR 215 can be a separate device connected to the fabric 201, or can be part of one or more switches within the fabric 201. Management node 225 can allow a user to manage the fabric and fabric elements.

iSAR 215 can form an interface between the storage, as seen by the servers 203, 205, and 207, and physical storage provided by storage devices 209, 211, and 213. iSAR 215 can abstract the physical storage to logical storage by aggregating several physical storage units to form one or more logical virtual storage units. The applications and/or operating systems on servers 203, 205, and 207 no longer directly access storage devices 209, 211, and 213. Instead, the servers interact with virtual storage provided by the virtualization entity iSAR 215. For example, iSAR 215 can present virtual storage 217, which includes virtual volumes 219, 221, and 223, to the servers. Each virtual volume can be assigned to only one or more than one server. For example, virtual volume 219 can be assigned to server 203, such that the only storage visible to server 203 is the virtual volume 219. Alternatively, virtual volume 219 can be visible to all servers 203, 205, and 207. Virtual volumes 221 and 223 can be similarly configured.

Any request to access storage can be redirected to iSAR 215 using Frame Redirect (FR) technology. In FR technology, a switch can present a virtual target to a host (e.g., servers 203, 205, and 207) in place of actual physical devices (e.g., storage devices 209, 211, and 213). For example, virtual volumes 219, 221, and 223 can be presented to servers 203, 205, and 207 as virtual targets. However, the WWNs (world wide names) of the virtual targets can be the same as the WWNs of the physical storage devices. Frames sent from the servers for physical storage devices, are instead directed to a redirection switch, such as iSAR. The redirection switch sends the frame to the physical storage device, but the frame includes the WWN of the server instead. In this manner, the server believes that it is sending frames directly to a physical storage device connected to the switch, while the physical storage device believes that it is receiving frames directly from a server. When a new virtual target device is added to the fabric, because the WWN of the new virtual target device is the same as an already known device within the fabric, the server need not reset its connection with the switch to determine a new virtual target (as would be the case if the virtual target had its own unique WWN). In addition, the access control lists and zoning configuration can remain constant. All the redirection switch does is send a registered state change notification (RSCN) message to the server with a new port ID associated with an already known WWN. For details on frame redirection please refer to U.S. patent application Ser. No. 12/140,898 filed Jun. 17, 2008, which is hereby incorporated by reference.

iSAR 215 can store information that maps virtual storage to physical storage. For example, iSAR 215 can map virtual disks 219, 221, and 223 to various physical storage devices such as 209, 211, and 213. In one possible configuration, iSAR 215 can map virtual disk 219 exclusively to physical disk 209. However, other configurations can also be envisioned where one or more virtual disks are mapped to one or more physical disks.

Figure 3:
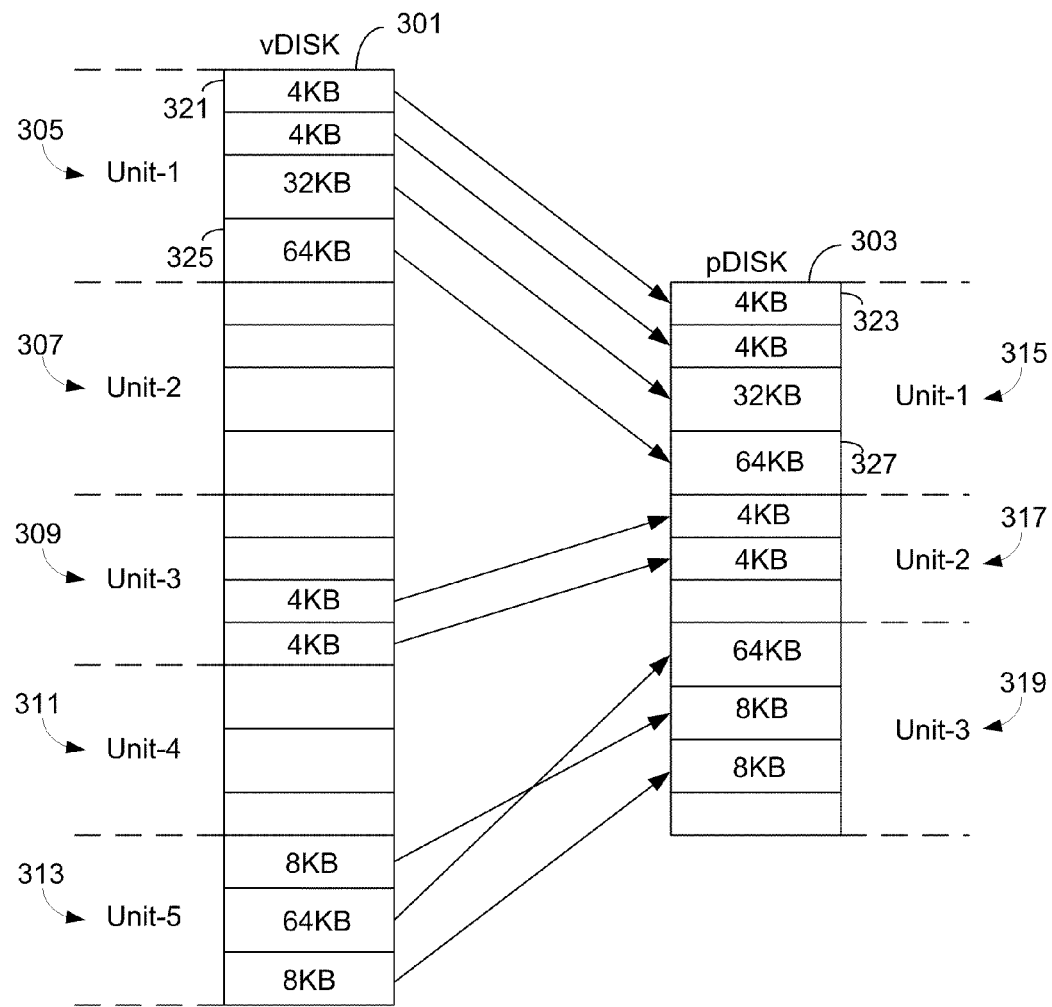
FIG. 3 illustrates storage virtualization using hierarchical sparse mapping.

FIG. 3 shows an example of hierarchical sparse mapping where virtual disk vDISK 301 is mapped to a physical disk pDISK 303. Both vDISK 301 and the pDISK 303 can be segmented into units. For example, vDISK 301 can be segmented into 5 units Unit-1 305, Unit-2 307, Unit-3 309, Unit-4 311, and Unit-5 313. Similarly, pDISK can be segmented into units Unit-1 315, Unit-2 317, and Unit-3 319. The mapping of the vDISK 301 to the pDISK 303 is based on units. For example, Unit-1 305 of vDISK 301 is mapped to Unit-1 315 of pDISK 303. Similarly, Unit-3 309 and Unit-5 313 of vDISK 301 are mapped to Unit-2 317 and Unit-3 319 of the pDISK 303.

The mapping of units in the vDISK 301 to the units in pDISK 303 is not limited to the configuration shown in FIG. 3. For instance, Unit-1 305 of vDISK 301 may be mapped to Unit-3 319 of pDISK 303, while Unit-5 313 of vDISK 301 may be mapped to Unit-1 315 of pDISK. In other words, any unit from the vDISK 301 can be mapped to any free unit on the pDISK. However, as opposed to the configurations disclosed in FIG. 1, addresses within a unit in the vDISK 301 are mapped to addresses within a single unit in the pDISK 303.

Size of each unit on vDISK 301 typically depends upon the corresponding server application. For example, with a file system application the maximum size of a unit on vDISK 301 may be 2 MB, while with an ORACLE® database application the maximum size of a unit of vDISK 301 may be 10 MB. The size of the units of pDISK 303 depend upon the size of the corresponding unit in the vDISK 301, the type of data being stored, as well as the mode of storing (compressed, uncompressed, de-duplicated, etc.) the data blocks in the pDISK 303.

The logical blocks within a unit in the vDISK 301 can be mapped to logical blocks only within the corresponding unit in the pDISK 303. For example, as shown in FIG. 3, logical block 321 of size 4 KB in Unit-1 305 of vDISK 301 is mapped to logical block 323 in Unit-1 315 of pDISK 303. Although FIG. 3 shows that the logical blocks in Unit-1 305 of vDISK 301 are mapped to the logical blocks in Unit-1 315 in pDISK 303 in the same order, the order is merely an example, and not a rule. As an alternative, for example, logical blocks of Unit-5 in vDISK 301 can be mapped in a different order to the logical blocks of Unit-3 319 in pDISK 303. The ordering in mapping of logical blocks from the vDISK 301 to the pDISK 303 may depend on several factors, such as, the order in which the I/O request is received from the application, the size of the I/O operation, the location of available logical blocks in pDISK 303, etc.

Referring again to FIG. 3, the hierarchical sparse mapping can map a logical block of a certain size in vDISK 301 to a logical block of the same size on pDISK 303. For example, logical block 325 of 64 KB is mapped to a 64 KB logical block 327 in the pDISK 303. Alternatively, the data written to the pDISK 303 can be compressed during the I/O operation such that the available storage on the pDISK 303 is efficiently utilized. For example, when the host writes data to the vDISK 301 of size 4 KB, the data can be compressed (to say 512 bytes) and stored in the corresponding unit in the pDISK 303. In addition the storage space allocated to a unit on the pDISK 303 is reduced. This can allow iSAR 215 to map additional virtual units to pDISK 303.

Figure 1:
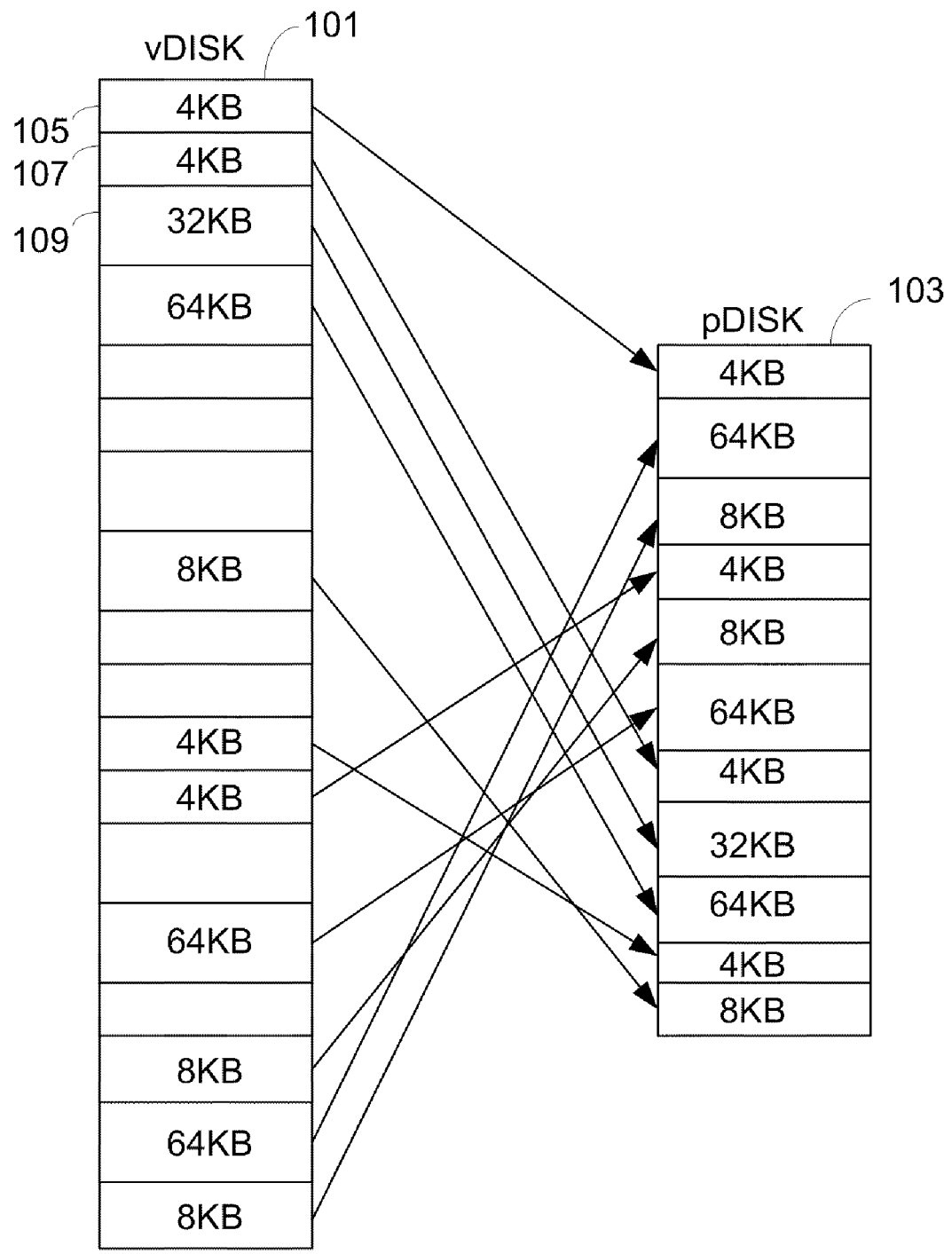
FIG. 1 illustrates a traditional virtualization implementation using thin provisioning.

Hierarchical sparse mapping, depicted by way of example in FIG. 3, has several advantages over the traditional sparse mapping shown in FIG. 1. The mapping information (or "metadata") for the hierarchical sparse mapping is smaller in size as compared to the metadata associated with traditional sparse mapping. For example, with mapping disclosed in FIG. 3, only the metadata related to the most recently addressed unit in the vDISK 301 needs to be stored in memory closest to the processor (e.g., cache, DRAM, etc.). On the other hand, with traditional sparse mapping shown in FIG. 1, the metadata related to the whole vDISK 301 needs to be present in memory or cache.

Because the logical blocks in the pDISK 303 are allocated in terms of units, the logical blocks allocated within the unit are thus stored in close proximity to each other. As a result, the effects of data fragmentation are considerably reduced. For example, while a logical block on vDISK 301 can be mapped to any location on the pDISK 303 when using thin provisioning (as shown in FIG. 1), with hierarchical sparse mapping logical blocks within a unit in vDISK 301 are mapped to a single unit in pDISK 303—thus remaining in close proximity. Another advantage of the close proximity of the data blocks on the pDISK 303 is that when the data is stored on a magnetic medium such as hard disk and tape drives, the amount of head movement for seeking the data blocks is considerably reduced. This not only reduces the seek time, and consequently the I/O operation time, but also increases the life of the storage media.

Figure 4:
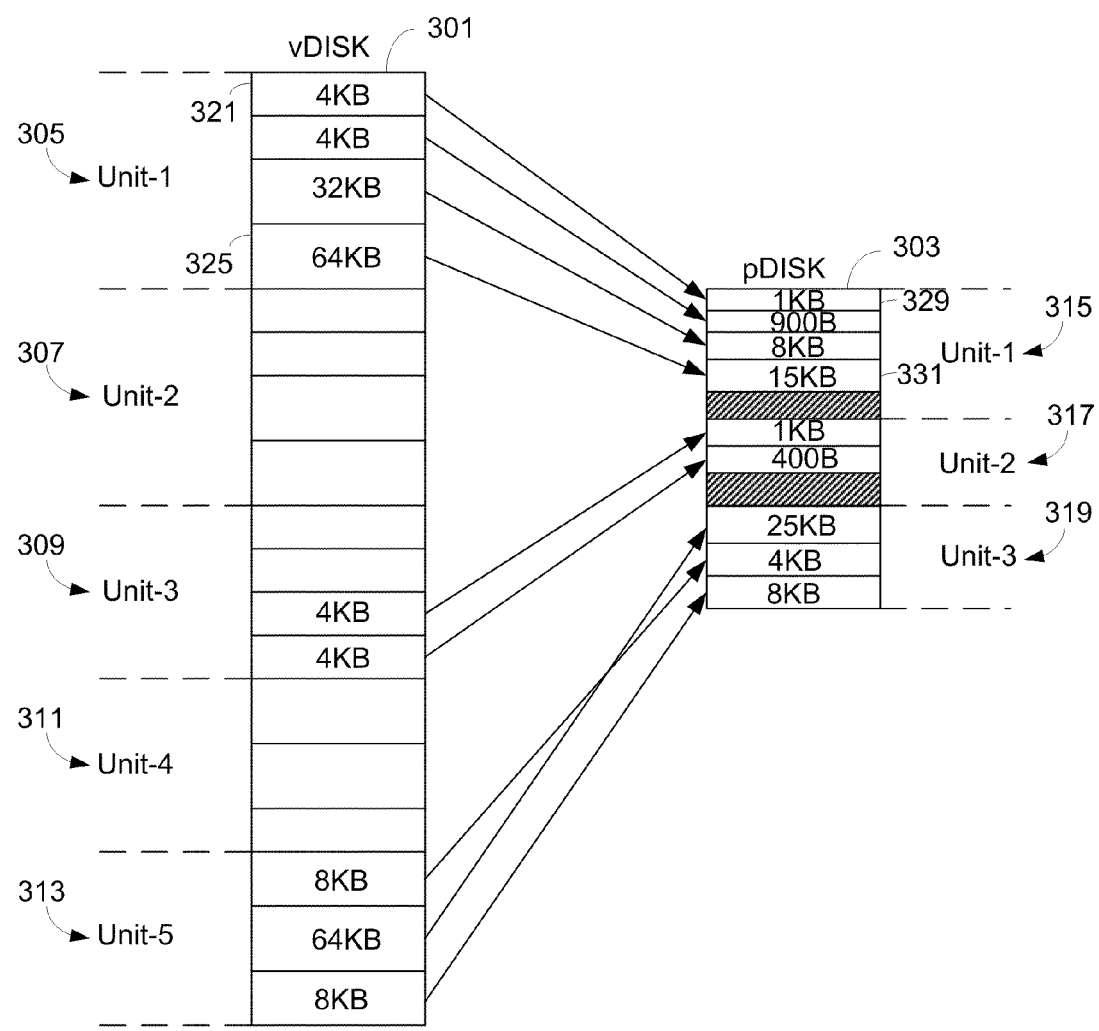
FIG. 4 illustrates storage virtualization using hierarchical sparse mapping with compression.

While FIG. 3 shows an example of hierarchical sparse mapping where the logical block from the vDISK 301 is mapped to a logical block of the same size in the pDISK 303, FIG. 4 shows an example of hierarchical sparse mapping where data is first compressed before being stored in pDISK 303. For example, logical block 321 of the vDISK 301 can be compressed to 1 KB 329 and stored in pDISK 303. The compression ratio may vary from one logical block to another. For example, logical block 325, which is of size 64 KB, is shown to have been compressed to 15 KB 331. The compression is carried out on-the-fly, i.e., the compression is carried out while the data is being written to the pDISK 303.

The compression may be implemented in hardware, for example, an ASIC, FPGA, processor, etc., or in software running on a processor. The software may be stored in volatile memory such as RAM, or in non-volatile memory such as FLASH, ROM, hard disk, etc.

The compression ratio is typically dependent upon the nature of data being compressed and the compression algorithm used. For example, the compression ratio may be high if the data contains a large number of redundant bits. Compression algorithms for compressing data are well known in the art and may include lossless compression algorithms such as Huffman coding, arithmetic coding, adaptive dictionary coding, predictive coding, etc.

Figure 5:
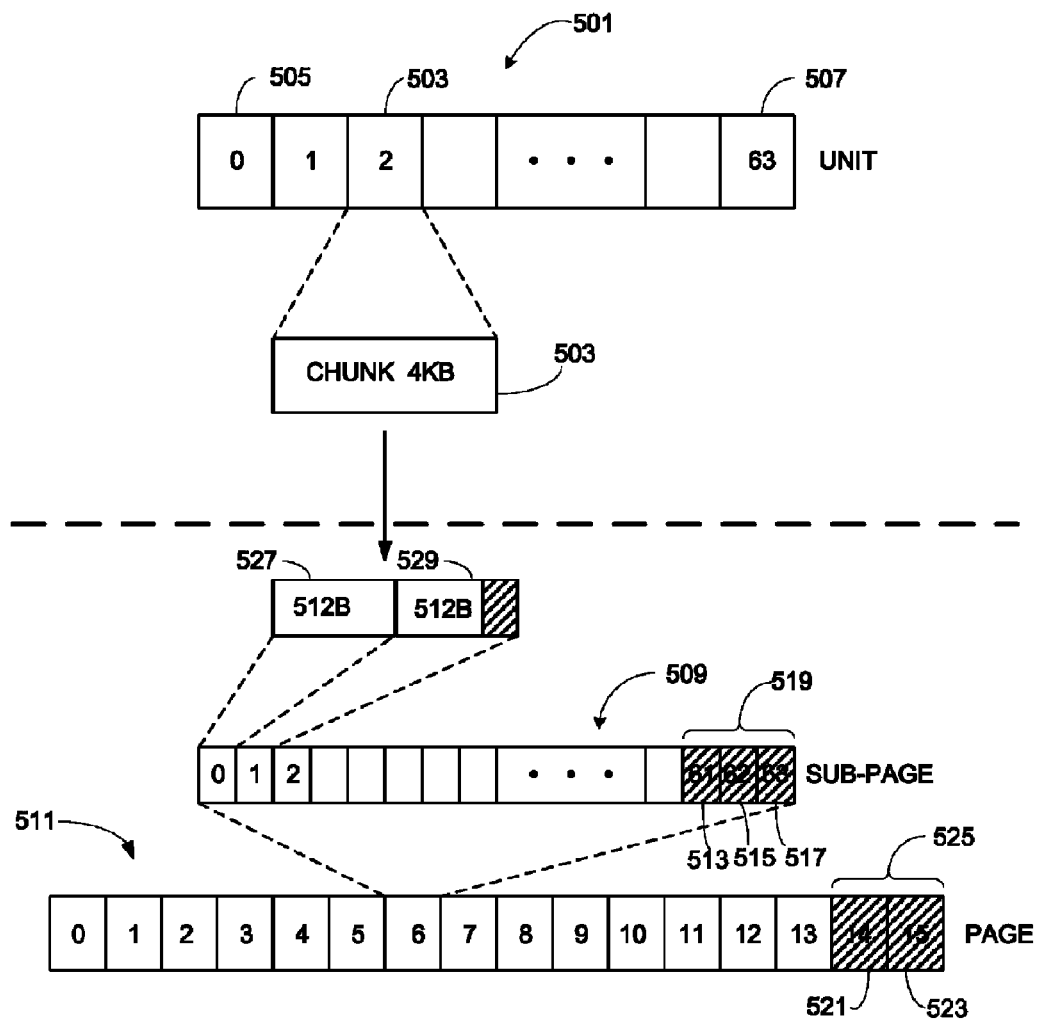
FIG. 5 shows an example of physical data block allocation with overflow reserve storage.

Each of the units of pDISK 303 shown in FIGS. 3 and 4 can include pages. A page can be a length allocation of bytes that can be transferred between the memory of iSAR and the physical storage. The page size can be programmable and may depend upon the application requirements. For example, the page size can be designed to be 512 KB. The selected page size may determine the number of pages assigned per unit in the pDISK 303. Further, the pages may comprise sub-pages, which in turn may comprise blocks. For example, FIG. 5 shows an exemplary page of size 512 KB including sixteen (16) sub-pages, each of size 32 KB. Each of the sub-pages can further include sixty four (64) data blocks. The data blocks can represent the smallest unit of storage in the pDISK 303. In effect the data blocks can form the smallest addressable units in the pDISK 303. Typical size of a data block is 512 bytes. However, the size for the data blocks may vary in accordance with the implementation and application requirements.

The logical blocks 321, 325, etc., in each unit of vDISK 301 can be referred to as "chunks." Chunking is the process that segments the incoming data stream into portions of certain size. Chunk size depends upon the type of chunking method employed. Fixed sized chunking, as the name implies, segments incoming data into fixed sized chunks. Incoming data is divided into chunks based on a preset chunk size. Variable sized chunking determine chunk boundaries based on the data content. Certain sequences of bits, called "anchors," set chunk boundaries for incoming data. By searching for these anchors, chunk boundaries, and consequently chunks, are determined. The following examples assume fixed sized chunking, although, variable sized chunking can also be used. After the incoming data is segmented into chunks, the chunks are stored (with or without compression) on the pDISK 303.

FIG. 5 discloses an example of storing a chunk onto pDISK. Virtual memory unit 501 can include 64 chunks— chunk-0 505 to chunk-63 507. The number of chunks within the unit 501 is not limited to 64 and may vary. For example, the number of chunks in Unit-1 305 of FIG. 3 is four. The size of the chunks may also vary depending upon the incoming data and the chunking algorithm used (fixed chunking or variable chunking) In the example shown in FIG. 5, fixed chunking is used with chunk-2 503 having a size of 4 KB.

The data of chunk-2 503 can be first compressed and then stored in the pDISK. For example, Chunk-2 503 of FIG. 5 may compress to 1000 bytes. The smallest addressable unit in the pDISK can be a data block of size 512 bytes each. As a result, the compressed data of chunk-2 503 will require an allocation of at least two data blocks on pDISK. Depending upon the data within the chunks and the compression algorithm employed, the data within the chunks may compress to different data sizes. This will affect the number of physical data blocks allocated to store the compressed chunk data. Number of data blocks allocated to each chunk may additionally depend upon the data block size. The data block size, however, is typically fixed for a particular medium. For example, the sector size for a magnetic medium is fixed at 512 bytes, and that for an optical medium is fixed at 2048 bytes. In a subsequent write operation, if the size of the compressed chunk allocated to a set of blocks changes, this change may result in the initially allocated blocks to be insufficient to store the larger size compressed chunk.

Data blocks can be grouped into a subpage, and subpages, in turn, can be grouped into a page. FIG. 5 shows and example where 64 data blocks can be grouped into a subpage 509, and 16 subpages can be grouped into a page 511. The size of each subpage can be $2^{15}$ bytes and the size of each page can be $2^{19}$ bytes. The subpage and page sizes can be different from the ones shown in the example in FIG. 5, and may be varied to optimize the performance of the system.

At least some of the subpages include data block overflow reserve storage (ORS). In FIG. 5, subpage-6 509 has data block 61 513, data block 62, 515, and data block 63 517 reserved as data block ORS 519. Similarly, at least one of the pages in the physical memory includes subpage overflow reserve storage (SORS). In FIG. 5 page 511 has subpage-14 521 and subpage-15 523 reserved for subpage ORS 525. Data block ORS 519 and subpage ORS 525 can provide additional storage when the compressed chunk expands beyond its originally allocated storage space. As stated earlier, one of the factors affecting compression ratio is the nature of data. For example, a 1 Kbyte of data consisting of only '0's may have a larger compression ratio than a 1 Kbyte of data consisting of a random sequence of '0's and '1's. Therefore, if the user changes the data within a file such that the resulting compression of the changed data occupies more space than the compression of the original data, then the storage of the changed data may result in an overflow. For example, chunk-2 503 in FIG. 2 was compressed from 4 Kbytes to 1000 bytes and stored in two data blocks 527 and 529. Note that because each data block is 512 bytes, two data blocks are required to store the compressed data of chunk-2 503 in the pDISK. Because the two data blocks 527 and 529 provide 1024 bytes in total while the compressed data of chunk-2 503 required only 1000 bytes, 24 bytes remain free.

If the user changes the data represented by chunk-2 503 such that, when compressed, the data size is 1500 bytes, then the previously allocated two data blocks, 527 and 529, will be insufficient to store the compressed data. In such a case, an additional data block can be allocated in order to store the now larger compressed data. Because the subpage-6 509 includes data block ORS 519, the compressed chunk data can be allocated to data block 61 513, data block 62 515, and data block 63 517. These three data blocks can provide storage for 1536 bytes—sufficient to store the compressed data size of 1500 bytes. As a result, because the sub-page includes data block ORS 519, the expansion of the compressed data did not result in reallocating the data in another page—which could require additional time.

Reallocating data to ORS frees up previously allocated data blocks. In the above example, by allocating compressed chunk-2 503 to ORS 519, data block 0 and 1 in subpage-6 509 are de-allocated. Therefore, data blocks 0 and 1 can now serve as the new ORS. In other words, any de-allocated data block, subpage, or page can be used for overflow reserve storage.

In cases where the subpage-6 509 is insufficient to contain the compressed chunk data, additional subpages may be required. For example, if the total size of compressed chunks allocated to subpage-6 509 expand to 60 KB (while the size of subpage-6 509 is 32 KB), two subpages will be needed to accommodate modified chunk data. As shown in FIG. 5, page-1 511 contains subpage ORS 525 in the form of subpage-14 521 and subpage-15 523. Therefore, the chunk data can be allocated to subpage ORS 525. Subpage-14 521 and subpage-15 523 provide 64 KB of space—sufficient to contain the now expanded compressed data size of 60 KB.

Additionally, overflow reserve storage can also be provided during data block allocation. For example, when storing compressed chunk-2 503 of size 1000 bytes, three (instead of two) data blocks can be allocated. Therefore, if the compressed chunk-2 increases in size, the extra preallocated data block can accommodate this increase in size. As a result, allocating new data blocks in subpage ORS or page ORS can be avoided. Additionally, because the compressed chunk-2 503 has not been reallocated, metadata (discussed below) associated with chunk-2 503 need not be modified—which avoids inserting additional delay to an I/O operation.

Including overflow reserve storage such as data block ORS 519 and subpage ORS 525 can prevent fragmentation of data stored on pDISK. This is because without providing overflow storage, the expanded chunks may have to be reallocated data blocks on another page that has sufficient free data blocks. Furthermore, if the page to which the compressed chunks have been reallocated to is not in iSAR's memory, then additional time may be required to bring the page from pDISK to iSAR's memory. In addition, reallocation will also require a write operation to metadata (data that stores mapping information), which can also require additional time. Time required to carry out these additional operations can negatively affect the performance of an I/O operation. Having ORS can mitigate these effects on I/O operation latency due to expanding compressed chunk size.

Figure 6:
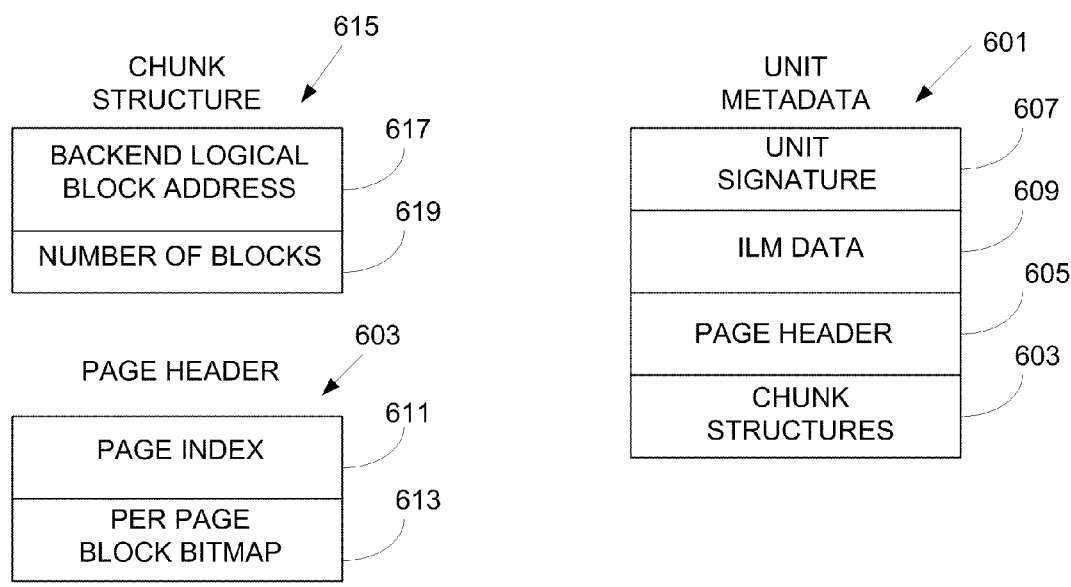
FIG. 6 shows metadata structures used in hierarchical sparse mapping.

FIG. 6 shows structures (also called "metadata") that, in part, store information that describe mapping from vDISK to pDISK. iSAR reads, and when required, modifies metadata of each I/O operation requiring access to physical storage. In its simplest form, metadata can include a table which maps the address of each chunk in vDISK to an address in pDISK along with information on the number of data blocks allocated to each chunk. However, hierarchical sparse mapping can include metadata for each unit in vDISK. Each unit metadata can, in turn, include data structures associated with each chunk within the unit. Metadata can also include information on the availability of data blocks on the pDISK, so that empty data blocks for initial allocation or reallocation can be quickly determined.

As shown in FIG. 6, unit metadata 601 can be a collection of chunk structures 603 and a page header 605. Each unit metadata 601 can include a unit signature 607, which can be frequently checked for data corruption indication. The unit signature may simply be the result of a logical operation, such as an exclusive-OR operation, on all the bytes within the unit metadata 601, or may be a cryptographic digital signature that is partially the function of the content of the unit metadata 601. But, any operation that can enable detection of corruption of metadata can be employed. Typically, the unit signature 607 can have a size of 4 bytes. The unit metadata 601 can also include information life cycle management (ILM) data 609. The ILM data 609 can indicate how often the unit metadata 601 is being accessed. If the unit metadata 601 is sparingly accessed, the unit metadata can be removed from high speed memory, e.g., cache, and moved to slower memory, e.g., RAM, instead.

Unit metadata 601 can also include a page header 605. The page header 605 can include information regarding the pDISK pages that have been allocated to the virtual unit represented by the unit metadata 601. Note that, as shown in FIG. 3, pages 323-327 on pDISK 303 can be allocated to the data in virtual Unit-1 305 in vDISK 301. Page header 605 can include a page index 611 that can identify pages, e.g., pages 323-327, allocated to a particular unit, e.g., Unit-1 305. Furthermore, the page header 605 can also include a per page block bitmap 613 that indicates which of the data blocks within each page have already been allocated and which data blocks are free. This is of particular advantage when the subpage ORS 525 is insufficient for incoming compressed chunk data, and another set of data blocks that are free needs to be quickly determined. For example, if the incoming compressed chunk needs to be allocated seven contiguous blocks, then the bitmap can provide information on the availability and location of the required data blocks.

Unit metadata 601 can also include chunk structures 603 for storing mapping information for each allocated chunk within the unit. As shown in FIG. 6, a chunk structure 615 can include information on a backend logical block address 617 and on the number of blocks 619 allocated to the chunk when stored in pDISK. For example, chunk 321 (4 KB) of vDISK 301 in FIG. 3 can be stored at address 0x1000 in the pDISK 303. Assuming that the size of a single data block on the pDISK is 512 bytes, the number of data blocks needed to store 4 KB will be 8. As a result the chunk structure associated with chunk 321 will include backend logical block address as 0x1000 and the number of blocks as 8. If chunk 321 is compressed (to say 1 KB) before being stored in the pDISK, as shown in FIG. 4, the number of logical blocks can be equal to the number of blocks needed to store 1 KB of compressed chunk 321. Therefore, if the size of a single data block on the pDISK is 512 bytes, the number of data blocks will be 2.

The number of chunk structures 603 within the unit metadata 601 can depend upon the number of chunks within each unit in the vDISK. For example, if the size of the virtual unit, Unit-1 305, in vDISK 301 in FIG. 5 is 4 MB and each chunk is of the size 4 KB, then the number of chunks within Unit-1 305 will be 1024. Consequently, the number of chunk structures 603 in the unit metadata for Unit-1 305 will be 1024.

The size of unit metadata 601 depends upon the sizes of the unit signature 607, the ILM information 609, the page header 605 and the chunk structures 603. The sizes of the unit signature 607, the ILM information 609, and the page header 605 can be typically constant. For example, the size of the unit signature 607 and the ILM information 609 can be 4 bytes each. However, dynamic sizing of the unit signature 607 and ILM information 609 can also be accommodated. In such cases, the effect of their dynamic size on metadata cache size (discussed below) may have to be taken into account. The page header 605 size can depend upon the number of pages that are allocated within a unit in the pDISK. For example, if the unit size in pDISK is 4 MB, and each page size is 512 KB, then the number of pages will be 8. Therefore, the page index 611 can contain the physical addresses of 8 pages allocated to the corresponding unit in the vDISK. Assuming each physical address is 32 bits wide, the page index 611 can have a size of 4 bytes. Per page block bitmap indicates which of the data blocks within each page have already been allocated and which data blocks are free. For example, if each data block is of the size 512 bytes, then the bitmap per page of size 512 KB will be 128 bytes. Therefore, bitmaps for 8 pages will take up 1 KB of memory. As a result, the size of the page header can be approximated to be slightly larger than 1 KB.

Returning to determining an exemplar size of the unit metadata 601, as discussed in the above examples, the size of the unit signature 607 can be 4 bytes, the size of ILM information 609 can also be 4 bytes, and the size page header 605 can be approximately 1 KB. Also, the size of a chunk structure 615 can be 8 bytes (4 bytes for backend logical block address 617 and 4 bytes for number of blocks 619) and there can be 1024 chunk structures. Adding these up, the exemplar size of the unit metadata can be approximately 9 KB.

The metadata can also include a page structure (not shown) that includes information on the empty/used status of pages in the pDISK. This page structure can include a bitmap, where each bit corresponds to a single page in the pDISK. Each bit can be either a '0' or a '1' to denote whether the corresponding page is empty and available to be written to or whether the page has already been allocated and unavailable to be written to. The page structure can be used when new incoming data chunks need to be stored in pDISK and information on availability of pages that can be allocated to the new incoming data chunk is required. The page structure can also be used when an already stored data needs to be re-allocated, perhaps due to overflow, and information on available pages is needed. The page structure can include information on all the pages within the pDISK. For example, if the page size for the pDISK is 512 KB and the pDISK is of 1 TB, then the page structure bitmap will have $2^{21}$ bits (=256 KB) that represent all the pages in the pDISK. Thus, the size of the page structure can depend upon both the page size and the size of the physical disk. The page structure can alternatively include information on only part of the pDISK.

Because both the unit metadata and the page structure may be frequently needed, they can be stored in cache. The minimum cache size needed will depend upon the sizes of the page structure and the unit metadata. For example, if the page structure is designed to include information of all pages of 512 KB each for 1 petabyte of pDISK, then the size of the page structure will be $2^{50}/2^{19}=2^{31}$ bits, or 256 MB. Following the example presented previously, the size of the unit metadata was approximately 9 KB. Each unit metadata 601 corresponds to a unit in the vDISK. Therefore, the number of unit metadata structures that may be needed in the cache can depend upon the number of units that may be accessed at any given time. The number of units that may be accessed at any given time by the user I/O operation can, in turn, depend upon the data bandwidth supported by the switch/fabric. For example, if the data bandwidth is 48 Gbps, then the actual user data (due to 8/10 encoding) will be 4.8 GB per second. If the virtual unit size is assumed to be 4 MB, then the number of units in the vDISK that can be accessed any second (assuming random I/O distribution over the vDISK) will be 4.8 GB/4 MB~1000 units. The size of unit metadata associated with approximately 1000 units will be 9 KB×1000~9 MB. Therefore, to store both the page structure and the unit metadata in cache a cache size of at least 266 MB will be required. This can be easily accommodated with current technology.

As discussed previously, incoming data can be divided into fixed chunks before being stored in pDISK. In effect, the virtual memory space can be seen as a series of chunks with chunk boundaries located at every 4 KB (or some other fixed size). I/O operations typically read or write data starting at chunk boundaries, however, certain I/O operations may read or write data starting at virtual memory addresses that are unaligned with chunk boundaries. Examples described in FIGS. 7-8 describe iSAR behavior for aligned and unaligned I/O operations.

Figure 7A:
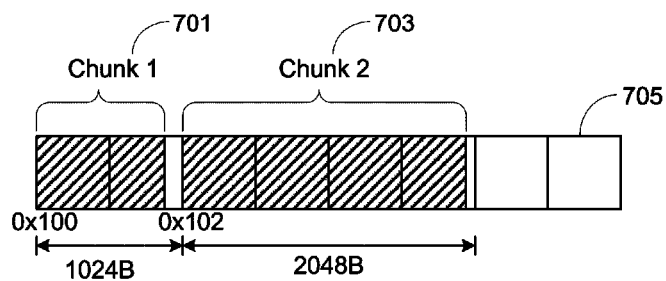
FIG. 7 illustrates effects of variable compressed chunk size on data block allocation and metadata.
Figure 7B:
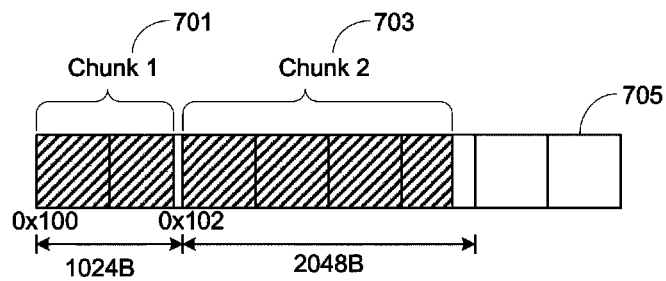
Figure 7C:
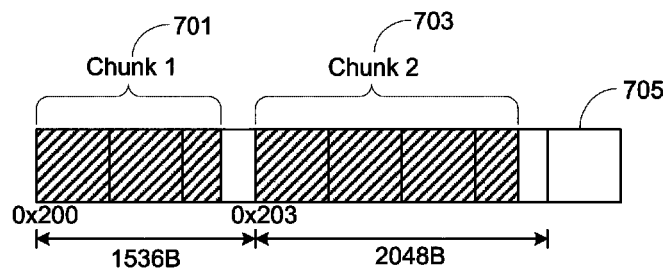

FIGS. 7A-7C illustrate examples showing the effect of changes in the compressed chunk size on the allocation of data blocks on the pDISK and on the unit metadata. In this example, the size of the I/O operation—data write—to the vDISK is assumed to be 8 KB. It is also assumed that the chunk size is 4 KB. Therefore, the data write operation of 8 KB will result in two chunks of 4 KB each. These chunks are shown to be compressed before being stored in the pDISK. The resulting size of the compressed chunks is dependent upon the data within the chunk. In FIG. 7A, compression of chunk-1 701 results in 900 B while the compression of chunk-2 703 results in 2011 B. It is also assumed that the data block size on the pDISK is 512 bytes. As a result, to store the compressed chunk-1 701 in page 705 on pDISK, at least two data blocks will be required. Similarly, four data blocks will be required to store compressed chunk-2 703 of size 2011 B. As shown in FIG. 7A, compressed chunk-1 701 can be allocated two data blocks starting at address 0x100 on pDISK. Compressed chunk-2 703 can be allocated four data blocks starting at address 0x102 on pDISK. Note that the addresses 0x100 and 0x102 are merely for illustrative purposes, and do not represent the actual address word size or address location on the pDISK. Because the size of the compressed chunks is less than the total physical space allocated to those chunks, the remaining space in the data blocks can be filled using padding bits. For example, because the size of compressed chunk-1 701 is 900 B, the second data block allocated to compressed chunk-1 701 can be padded with 124 B. Similarly, the fourth data block allocated to compressed chunk-2 703 can be padded with 37 B.

The metadata of the unit to which the stored chunks are associated with can be updated with the new allocation information. As shown in the example of FIG. 6, the unit metadata 601 includes chunk structures 603 associated with each chunk. The chunk structure associated with chunk 1 in FIG. 6 can include the backed logical block address of 0x100 and the number of blocks as two. Similarly, the chunk structure associated with chunk 2 in FIG. 6 can include the backend logical block address of 0x102 and the number of blocks as four. The chunk structure can additionally include information on the number of bytes of padding associated with each chunk. The page header 605 associated with the unit can include address of page 705 in the page index. The page block bitmap for page 705 can indicate that two data blocks starting at address 0x100 and four blocks starting at address 0x102 have been assigned.

FIG. 7B illustrates an example where changes made by the user have resulted in the compressed chunk sizes to change. Compressed chunk-1 701 can now be of size 1001 B and compressed chunk-2 703 can now be of size 1804 B. Previously, two data blocks starting at address 0x100 were allocated to compressed chunk-1 701 resulting in a total allocation of 1024 B. The increase in size of the compressed chunk-1 701 from 900 B to 1001 B can still be accommodated within the allocated two data blocks. Compressed chunk-2 703 can also be accommodated within the allocated four data blocks starting at address 0x102 because its size has reduced to 1804 B. Because there has been no reallocation compressed chunks 701 and 703, the unit metadata can remain unchanged.

FIG. 7C illustrates an example where the compressed chunks 701 and 703 have to be reallocated. Because the size of compressed chunk-1 701 has increased to 1201 B, previously allocated two data blocks of size 1024 B are insufficient to accommodate this increase. To allocate a new set of data blocks to the compressed chunks 701 and 703, the per page data block bitmap (FIG. 6, 613) in the unit metadata 601 can be examined for determining the required number of data blocks. Because the compressed chunk-1 701 size is 1201 B, three data blocks will be needed to be allocated. The size of compressed chunk-2 703 can still be accommodated within four data blocks. Therefore, seven data blocks will now be required to be allocated to the compressed chunks 701 and 703. Block bitmap 613 associated with page 705 can be examined for seven free/unallocated data blocks. The required data blocks can be allocated from anywhere within the page 705. The required data blocks can also be allocated form the sub-page ORS (519 in FIG. 5), or from the page ORS (525 in FIG. 5). As shown in FIG. 7C, compressed chunk-1 701 can be allocated three data blocks starting at address 0x200 while compressed chunk 703 can be allocated four data blocks starting at address 0x203.

As an alternative, non-contiguous data blocks may be selected for compressed chunk allocation. For example, instead of allocating compressed chunks 701 and 703 a contiguous set of seven data blocks from address 0x200, compressed chunks 701 and 703 can be allocated data blocks starting at 0x200 and 0x300 (i.e., non-adjacent data blocks). One advantage of having compressed chunks 701 and 703 in contiguous data blocks on pDISK can be that the reading and writing compressed chunks can be a simple operation requiring a starting address and an offset (in terms of number of blocks). However, due to repeated reads and writes in the pDISK, the pDISK may get fragmented—making it difficult to always find large number of contiguous data blocks. In such situations, non-contiguous data block allocation may be more efficient in terms of storage space. However, reads and writes for non-contiguous chunks can require more information than just the starting address and the offset, such as the number and locations of intermediate blocks that need to be discarded. Further, if the first and last blocks are located far apart from each other (e.g., on different pages), it may require more than one pDISK access to retrieve all the compressed data chunks—which can increase the total I/O operation time.

Figure 8:
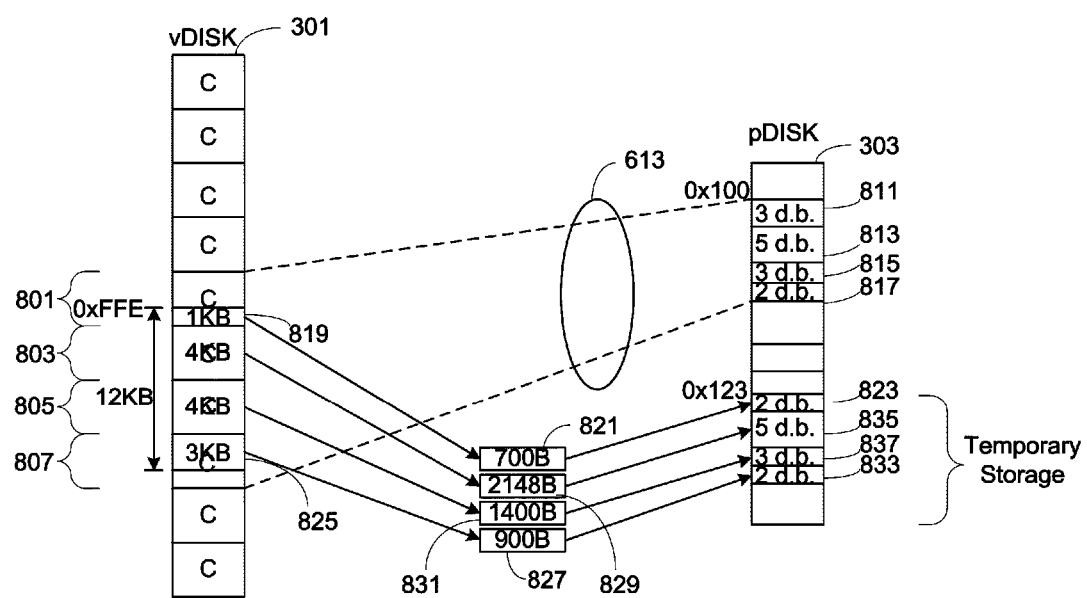
FIG. 8 illustrates data block allocation for unaligned I/O operation.

FIG. 8 illustrates an example where a user I/O operation begins at an address in the vDISK that is not aligned with chunk boundaries. For example, the most common un-aligned chunk accesses are ones that access file system metadata. Chunks 801, 803, 805, and 807 had been previously compressed and allocated data blocks in pDISK indicated by the dotted lines 809. Chunk 801 had been allocated 3 data blocks 811, chunk 803 had been allocated 5 data blocks 813, chunk 805 had been allocated 3 data blocks 815, and chunk 807 had been allocated 2 data blocks 817. The I/O operation that caused the previous allocation for chunks 801, 803, 805, and 807 was of size 12 KB starting at a vDISK address that is aligned with the start of the chunk 801. A new I/O operation can occur where although the size of the I/O operation can still be 12 KB, the starting address is not at a location where a chunk begins. Such a starting address can be, for example, 0xFFE, as shown in FIG. 8, where the I/O operation begins at the last 1 KB of chunk 801 and ends at the first 3 KB of chunk 807.

Normally, an unaligned I/O operation would require a read-modify-write, i.e., chunks 801, 803, 805, and 807 would have to be first read from the pDISK, then uncompressed to the original 4 KB size, then modified with the new partial chunk, and then recompressed and rewritten to the pDISK. This, of course, is time intensive, and therefore increases the cost of an unaligned I/O operation. But, the example illustrated in FIG. 8 can avoid a read-modify-write operation by allocating a designated temporary storage to the unaligned I/O. Later, during downtime, the data blocks in the temporary storage can be combined with the data blocks in the original storage location. Any time or duration during which the vDISK is not accessed can be considered as downtime. Downtime can also be predefined as a duration of time for which vDISK is not accessed. If iSAR detects the elapse of this duration of time, it can begin combining data blocks from the temporary storage with the data blocks in the original storage location. Additionally, iSAR can carry out defragmentation on the pDISK during downtime.

Referring to FIG. 8, portion 819 of chunk 801, which can be compressed to size 700 B 821, can be allocated 2 data blocks 823. Similarly, portion 825 of chunk 807, which can be compressed to 900 B 827, can be allocated 2 data blocks 833. Chunks 803 and 805, which can be compressed to 2148 B 829 and 1400 B 831, can be allocated 5 data blocks 835 and 3 data blocks 837, respectively. During downtime, data blocks starting at 0x123 in the temporary storage can be decompressed along with the data blocks starting at 0x100 (indicated by dotted lines 809). Once the data in data blocks 811, 813, 815, and 817 is decompressed, the decompressed data represents 16 KB of data that was previously allocated to chunks 801, 803, 805, and 807. Note that the first 3 KB of the data is unaltered, because the unaligned address 0xFFE points to the last 1 KB of chunk 801. The data decompressed from the temporary storage can be overlaid onto the decompressed data blocks starting at the byte after the first 3 KB. After replacing, the data can be recompressed and stored back at location 0x100. Because this process can be carried out after the unaligned I/O operation, the actual I/O operation time is not affected. iSAR merely acknowledges that the I/O operation has been completed once the data is stored in the temporary storage. In fact, the unaligned I/O operation time can be the same as the I/O operation where the starting address is aligned with a chunk boundary.

The temporary storage can be allocated within each page of the pDISK. A large number of data blocks assigned for temporary storage can be beneficial in accommodating a large number of unaligned I/O operations. However, the large amount of temporary storage will reduce the amount of data blocks available for allocation with aligned I/O operations. Preferably, the number of data blocks assigned for temporary storage is 20.

iSAR can also receive I/O operations where the I/O size is smaller than the chunk size. For example, if the chunk size is assumed to be 4 KB, an I/O operation for accessing data smaller than 4 KB can be termed as small I/O. Due to their smaller size, small I/Os can fall within the chunk boundaries in the vDISK. For example, referring to FIG. 8, a small I/O operation can be directed to 1 KB of data starting at address 0xFFE. Small I/O operations can resemble unaligned I/O operations, discussed previously, in that at least some part of the data being accessed within the vDISK lies within chunk boundaries. As a result, a small I/O operation may require a read-modify-write operation to first read the data blocks associated with chunk 801, uncompress the read data, modify the uncompressed data with the data in the small I/O operation, and finally recompress and write the compressed data back to the pDISK. In addition, the metadata may need to be modified to reflect the changes in the compressed chunk allocation.

Because small I/O operations can occur only sparingly, the time penalty incurred due to read-modify-write operation may be within allowable limits. However, if additional time due to read-modify-write cannot be tolerated, then the chunk being accessed by the small I/O operation can be modified and stored in the temporary storage shown in FIG. 8. Subsequently, during downtime, chunk data in temporary storage could be decompressed and overlaid on the original chunk data (as described with respect to unaligned I/O).

Alternatively, data associated with small I/O operations can be stored to the pDISK without any compression. Because this data is already small, not compressing it before storing it in pDISK can be only minimally disadvantageous. But, advantageously, because the data is not compressed a write operation that is addressed to a location that is unaligned with the chunk boundary in vDISK, need not require a time consuming read-modify-write operation as would be the case if the data were stored with compression. By avoiding a read-modify-write operation, the write operation latency is minimal.

Compressing data chunks before storing them in physical storage permits iSAR to provision an amount of virtual disk space that is larger than the available physical storage. For example, if full utilization of physical storage is assumed, a 2-5 times average compression can allow iSAR to provision virtual address space that is 2-5 times the available physical storage space. iSAR can employ additional mechanisms that can allow for further compression. Deduplication is one such method, which strives to store only a single copy of possibly several duplicate incoming chunks to physical storage. Each incoming chunk is processed to produce an associated chunk ID. Chunk IDs can be produced using, for example, a cryptographic hash algorithm such as SHA-1, SHA-2, MD5, etc., to create a bit-string associated with each incoming chunk. Chunk ID of an incoming chunk can be compared with chunk IDs of previously stored chunks. If a match is found, this indicates that a duplicate chunk is already present in the physical storage. As a result, the logical block address field in the chunk structure associated with the incoming chunk can now include the logical block address of the already stored chunk. Chunk structures of multiple incoming chunks can have their logical block addresses pointing to the same set of data blocks in the pDISK. If the chunk ID of the incoming chunk does not match any stored chunk IDs, then the incoming chunk is unique. Consequently, the incoming chunk and the associated chunk ID are stored.

Figure 9:
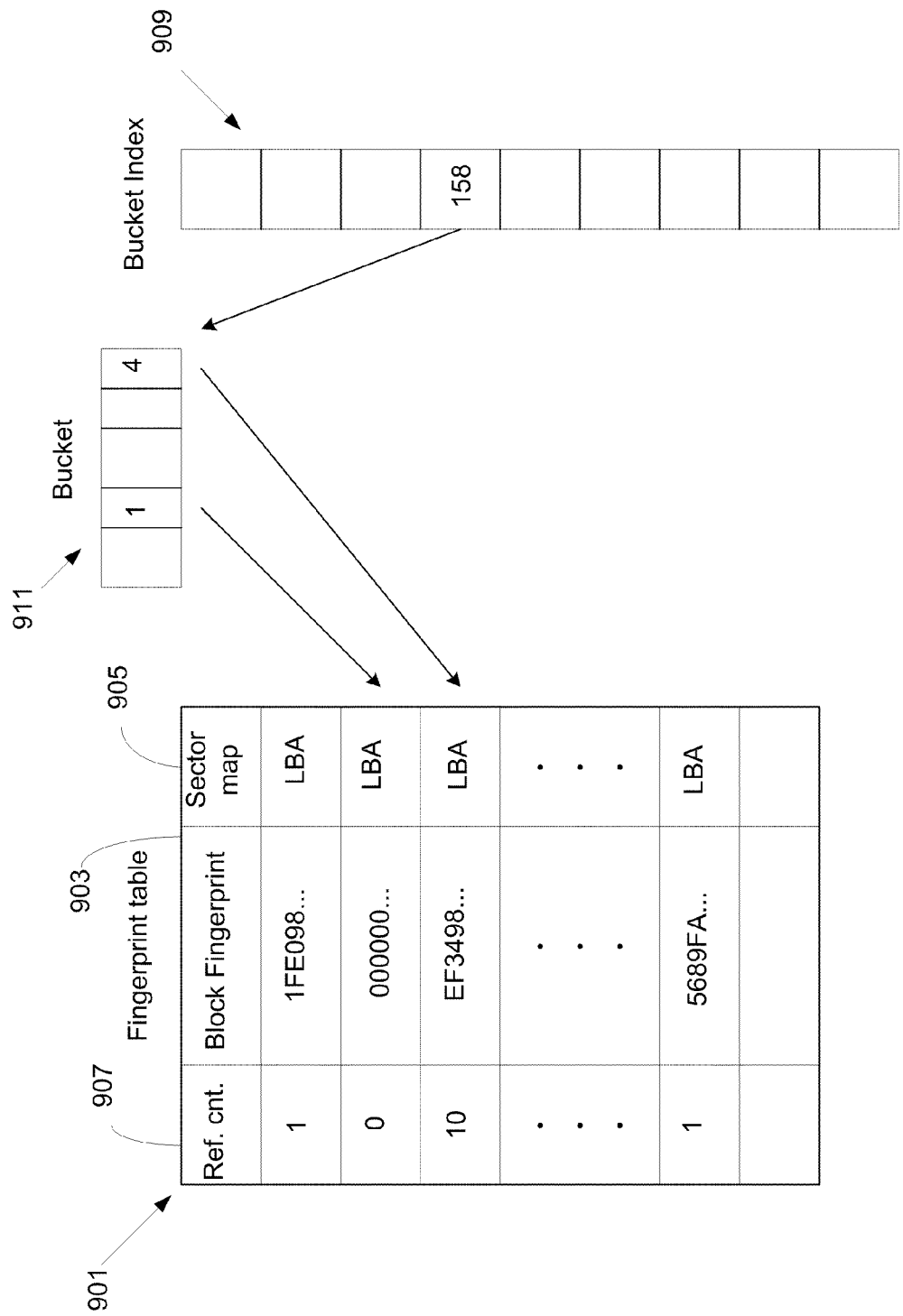
FIG. 9 shows data structures involved in deduplication of incoming chunks.

Deduplicating does not affect the metadata structures discussed with reference to FIG. 6. This is because deduplication is carried out before chunk data is compressed and stored to the pDISK. However, deduplicating can require additional metadata associated with the large number of chunk IDs that need to be stored. For example, FIG. 9 discloses data structures that can be used in implementing deduplication. A fingerprint table 901 includes a list of chunk IDs of all unique chunks stored in pDISK. Each entry in the fingerprint table 901 can include a 160 bit SHA-1 hash, or block fingerprint 903, of a chunk and an associated logical block address 905. The number of bits of block fingerprint 903 depends on the hash function employed to produce the block fingerprint. For example, if SHA-2 family of hash functions is used, then the block fingerprint can have a length from 224 to 512 bits. A reference count 907 field keeps track of the relevance of the chunk associated with the chunk ID. In other words, the reference count 907 field indicates the number of duplicate chunk having the same chunk ID. The reference count 907 field can be incremented each time a duplicate incoming chunk is mapped to the same logical block address and is decremented when a previously duplicate chunk is stored at a different location. When the reference count reduces to 0, the corresponding entry in the fingerprint table 901 can be deleted.

The size of the fingerprint table 901 can become prohibitively large. For example, a fingerprint table storing chunk IDs for $2^{32}$ chunks can be as large as 112 GB. Storing the entire fingerprint table in memory, for quick access, may be difficult. As a solution, the fingerprint table 901 can be indexed using partial bits of the hash function fingerprint to facilitate random searching. A bucket index 909 can include entries that are 24 bit wide, where the 24 bits represent the first 24 bits of an SHA-1 hash. However, the bucket index may alternatively have a width different from 24 bits. Note that the width impacts the size of the bucket index 909. For example, a 24 bit wide bucket index 909 will have a size of $2^{24} \times 4$ bytes=64 MB, which can be easily accommodated in computer memory. Reducing the width of bucket index 909 can reduce the size of the bucket index 909, but at the same time, can increase the size of buckets 911 (as discussed below).

Each entry in the bucket index 909 can also include a pointer to a bucket 911. Bucket 911 can include entries of all chunk IDs having the same first 24 bits. If it is assumed that the upper limit to the total number of chunks is $2^{32}$, then the average number of entries in each bucket 911 will be $2^{32}/2^{24}=256$. Each entry in the bucket 911 can point to an entry in the fingerprint table 901 where the logical block address of that particular chunk ID is stored. Therefore, the average size of each bucket 911 will be $256 \times (160-24) \times 32 \sim 14$ KB.

For an incoming chunk, first a chunk ID can be produced by hashing the contents of the chunk with a hash function, such as SHA-1. A set of bits of the chunk ID can be compared with bits in the corresponding positions in the bucket index 909. For example, the first 24 bits of the chunk ID are looked up in the bucket index 909. If a match is found, the matching entry in the bucket index 909 points to a bucket that includes all chunk IDs having the same first 24 bits. The remaining bits of the chunk ID can be compared with the corresponding bits of each entry in the bucket 911. If a match is found, then the matching entry will point to a fingerprint table 901 entry having the logical block address of the duplicate chunk. This logical block address can be written into the chunk structure for that chunk. However, no chunk data is written to the pDISK. Only the unit metadata is modified.

If, on the other hand, a match is not found in either the bucket index 909, or the bucket 911, then the incoming chunk can be treated as new. The chunk can be compressed and stored in the pDISK as described above when no deduplication of chunks is carried out. Accordingly, unit metadata and page structures can be modified to reflect the newly stored incoming chunk. Additionally, a chunk ID can be created and stored in the fingerprint table 901 along with the logical block addresses (and the number of blocks) of the location in pDISK where the compressed chunk is stored.

Figure 10:
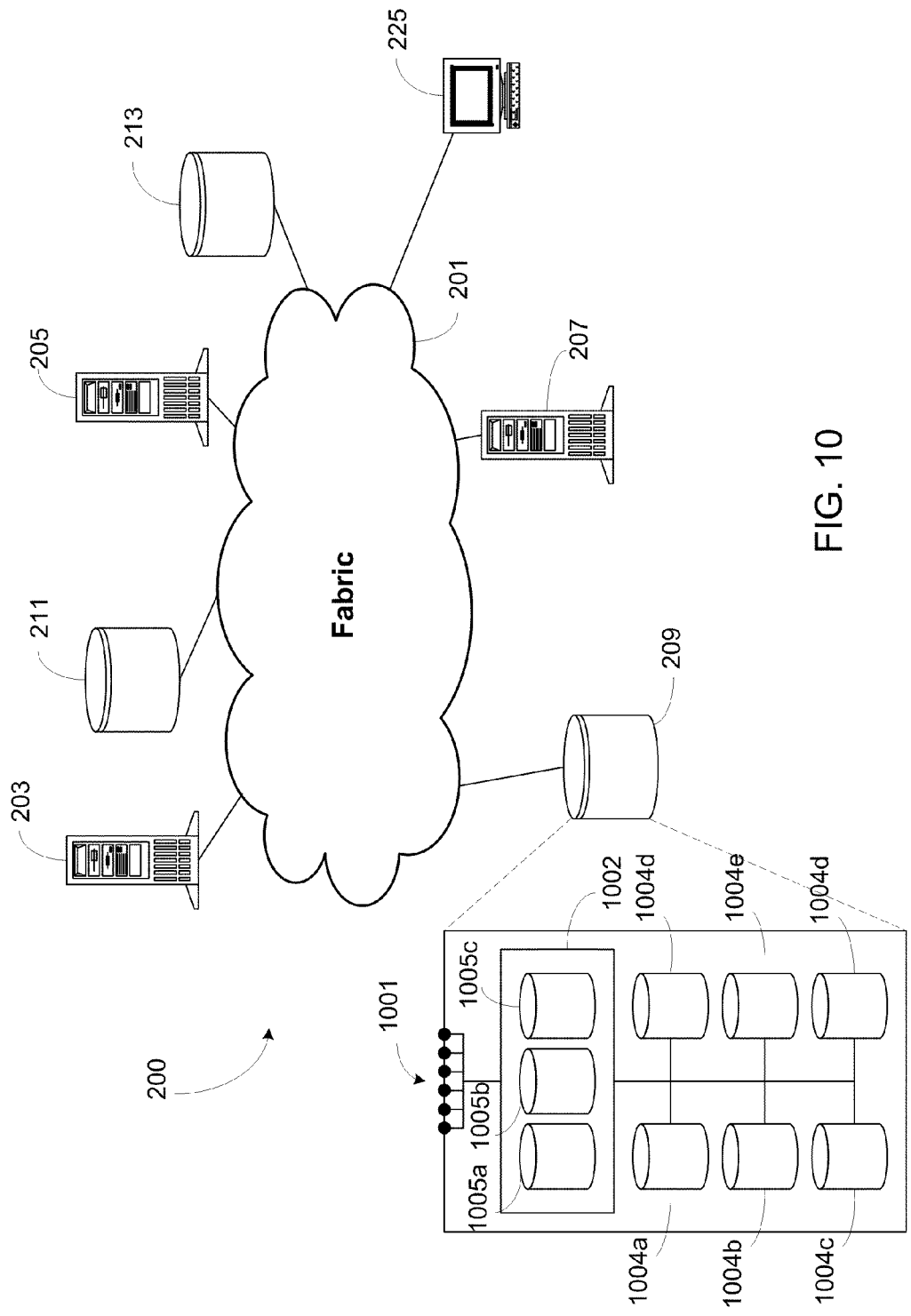
FIG. 10 shows the virtualization entity located within a storage device.

FIG. 10 shows an example where the virtualization entity is located inside a storage device. Typically storage device 209 can be shared by hosts/servers that belong to the same zone as the storage device 209. In the example shown in FIG. 10, it is assumed that servers 203, 205 and 207 can access storage device 209 by virtue of being in the same zone as storage device 209. The storage device 209 can be connected to the fabric 201 via a single or multiple N_Ports. For example, FIG. 10 shows storage device 209 having six ports 1001, any number of which can be utilized to connect to the fabric 201.

Storage device 209 can include a controller 1002 and one or more physical storage devices 1004a-1004f. The controller 1002 can act as a virtualization entity that presents virtual volumes 1005a-1005c to servers 203, 205, and 207, and maps virtual memory locations within these virtual volumes to memory locations on physical devices 1004a-f. Controller 1002 can include a processor, memory, I/O ports, and software for performing virtualization operations. The controller 1002 can also include a cache for accelerating read and write access to the servers 203, 205, and 207. The physical devices 1004a-f can be any IDE, SATA, SCSI, etc. based hard drives, tape drives, solid state drives, etc. The size of the physical devices 1004a-f can vary depending upon requirements. For example, each of the physical devices can be of size 250 GB-500 GB.

The controller 1002 acting as the virtualization entity can carry out all the operations described above with respect to the virtualization entity situated within the fabric (for example, where the virtualization entity 215 is situated within the fabric 201). But in this case, the physical storage is located within the storage device 209. The controller 1002 presents virtual volumes 1005a-1005c to each of the servers 203, 205, and 207 respectively. These virtual volumes can be addressed directly by the servers. Logical unit numbers (LUNs) can be associated with each virtual volume by the controller 1002. The servers can then address their read and write operations to the respective LUNs. The controller 1002 can also implement LUN masking so that the servers can only see the virtual volume assigned to them.

Figure 11:
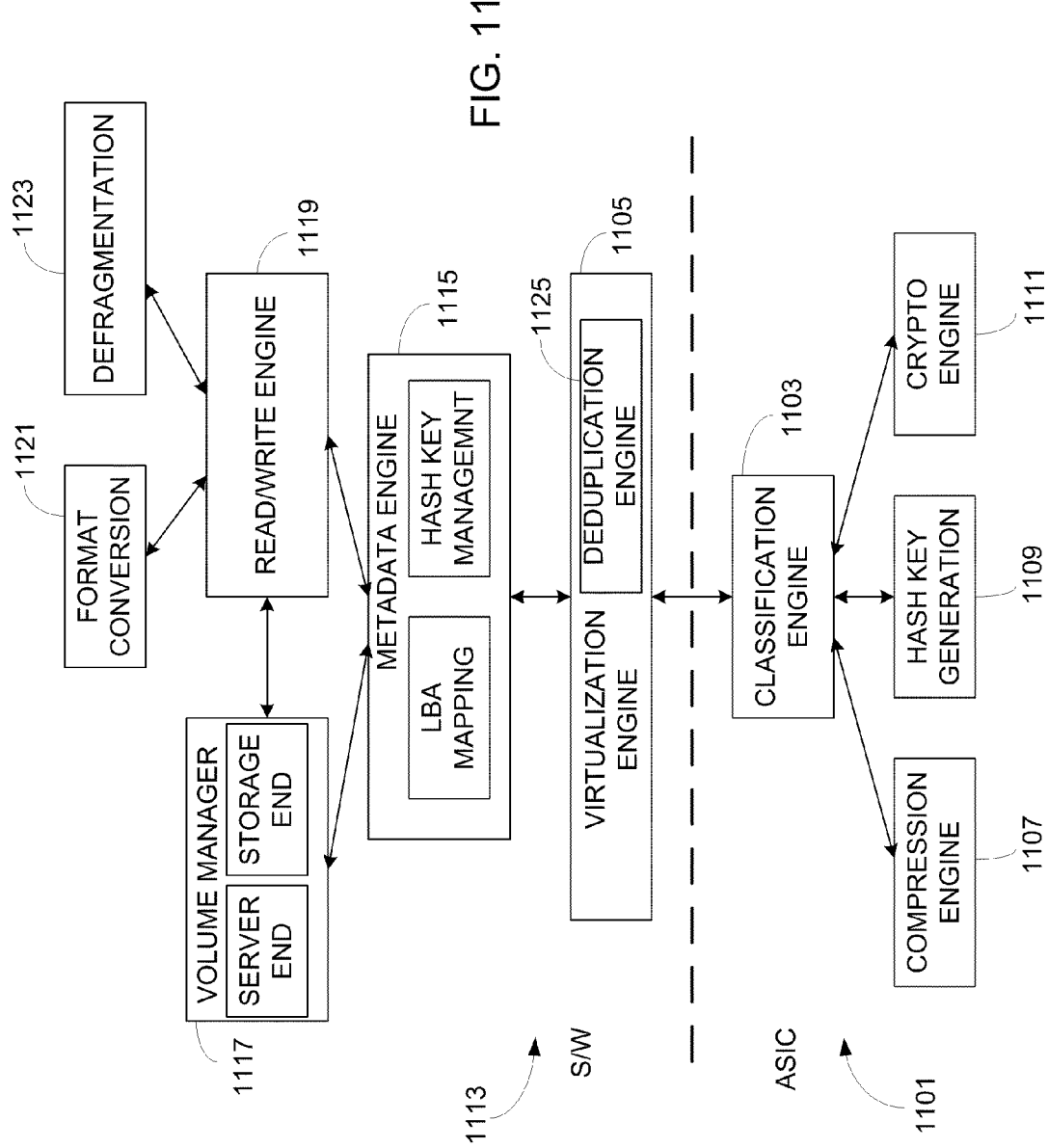
FIG. 11 illustrates an exemplary logical block diagram of the virtualization entity.

FIG. 11 discloses an exemplary logical block diagram of the iSAR 215. Although certain blocks are shown to be implemented in software and others in hardware, a person skilled in the art will appreciate that each of the blocks shown in FIG. 11 can be implemented in hardware or software or both. The hardware can include dedicated application specific integrated circuits (ASICs), field programmable gate arrays (FPGAs), general purpose central processing units, etc. Software can include program code for firmware, kernel, operating system, APIs, etc. Furthermore, the logical modules can be combined and implemented as a single logical module. Likewise, individual modules can be divided into one or more submodules.

Referring to the ASIC 1101, the classification engine 1103 performs filtering operation on incoming frames or packets. The classification engine 1103 can determine whether an incoming frame is part of an I/O operation, a management operation, etc. For example, when receiving a write I/O operation, the classification engine can refer to a set of rules stored in memory, extract information from the received frame, and communicate the information to a virtualization engine 1105. Subsequently, the virtualization engine 1105 can instruct the classification engine 1103 to perform chunking (variable or fixed with fixed chunk size) and compression of data associated with the incoming write operation. The compression block 1107 can carry out chunking and compression of data associated with an I/O operation. The hash key generator 1109 generates chunk IDs used for deduplication operation. Crypto engine 1111 can also be utilized for generating chunk IDs or may be utilized for aiding in secure communication by encrypting chunk data.

Referring to the software portion 1113, the virtualization engine 1105 is generally responsible for managing the virtualization operations on received I/O commands. The virtualization engine 1105 can determine the properties of vDISK and pDISK, such as size of virtual units, physical units, mapping, chunk sizes, hashing schemes, compression algorithm, etc. The virtualization engine can communicate with all of the logical blocks shown in FIG. 11. It can communicate with the metadata engine 1115 for accessing metadata related to the I/O operation being processed. The metadata engine 1115 manages unit metadata, page headers, fingerprint tables, etc., and provides this information to the virtualization engine 1105. The virtualization engine can include a deduplication engine 1125 for carrying out deduplication operations on I/O data. The volume manager 1117 can provide management of both vDISK and pDISK. It can provide the virtual volumes for each server and also manage backed physical storage. The read/write engine 1119 provides read/write operation to the storage devices. Format conversion engine 1121 can provide conversion between formats of different platforms or operating systems. Additionally, format conversion engine 1121 can compress data in an existing storage network when iSAR is employed within that network. The format conversion engine 1121 can also decompress and restore the data within a storage network when the user wishes to migrate from an iSAR to a non-iSAR solution. Defragmentation engine 1123 can carry out defragmentation of the allocated data on the physical storage.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method for virtualization of physical storage, the method comprising:
   mapping each of a plurality of virtual units in a virtual disk to a single one of a plurality of physical units in physical storage; and
   mapping a virtual address within a virtual unit to any physical address within the single one of the plurality of physical units.

2. The method of claim 1, further comprising:
   dividing data associated with a first write operation to a first virtual address within a first of the plurality of virtual units into chunks; and
   allocating a first set of data blocks in a first physical unit mapped to the first of the plurality of virtual units for each chunk.

3. The method of claim 2, wherein each chunk is compressed before the allocating.

4. The method of claim 3, further comprising:
   dividing data associated with a second write operation to the first virtual address into chunks;
   compressing chunks associated with second write operation; and
   allocating a second set of data blocks for each chunk from overflow reserve storage that is located within the first physical unit if the size of any of the compressed chunks associated with the second write operation exceeds the size of the previously allocated first set of data blocks.

5. The method of claim 4, wherein the overflow reserve storage is located within a page that also includes the first set of data blocks.

6. The method of claim 5, wherein the overflow reserve storage is located within a subpage of the page, wherein the subpage also includes the first set of data blocks.

7. The method of claim 3, further comprising:
   allocating temporary data blocks associated with a third write operation to a third virtual address within the first virtual unit, wherein the address space in the first virtual unit associated with the third write operation includes pre-allocated chunks, wherein the third virtual address is unaligned with chunk boundaries of the pre-allocated chunks, and wherein the pre-allocated chunks are allocated a set of data blocks in a physical unit corresponding to the first virtual unit, the temporary data blocks being separate from the set of data blocks allocated to the pre-allocated chunks; and
   overwriting the appropriate set of data blocks allocated to the pre-allocated chunks with data blocks from the temporary storage at a time after acknowledging completion of the third write operation.

8. The method of claim 7, wherein the overwriting comprises:
   decompressing data blocks allocated to the pre-allocated chunks; and
   replacing those decompressed data blocks allocated to the pre-allocated chunks that correspond to the virtual address space associated with the third write operation with data from the temporary data blocks.

9. The method of claim 1 further comprising:
maintaining a unit metadata data structure for each virtual unit for storing information describing mapping of the virtual unit to the physical unit and mapping of virtual addresses within the virtual unit to physical addresses in the physical unit.

10. The method of claim 9, wherein the metadata structure comprises a plurality of chunk structures, each chunk structure corresponding to a chunk in the virtual disk that has been allocated data blocks in the physical unit.

11. The method of claim 10, wherein each chunk structure includes a logical block address field indicating a physical address in the physical unit where the data associated with the chunk is stored, and a number of blocks field indicating the number of blocks allocated to the data associated with the chunk.

12. The method of claim 10, wherein the metadata structure further comprises a page header that includes a page index field identifying pages from the physical unit that have been allocated to the virtual unit and a per page block bitmap field identifying free and used data blocks within the pages from the physical unit.

13. The method of claim 1, further comprising:
dividing the data associated with a first write operation to a first virtual address in the virtual unit into chunks;
operating on at least one chunk to generate a signature associated with the at least one chunk;
comparing the signature associated with the at least one chunk with stored signatures of previously allocated chunks; and
if a match is found, copying physical disk allocation information associated with the previously allocated chunk corresponding to the matched signature to physical disk allocation information associated with the at least one chunk.

14. The method of claim 13, further comprising:
incrementing a counter associated with the matched signature of the previously stored chunk.

15. A virtualization device comprising:
a virtualization engine programmed for:
mapping each of a plurality of virtual units in a virtual disk to a single one of a plurality of physical units in physical storage; and
mapping a virtual address within a virtual unit to any physical address within the single of the plurality of physical units.

16. The virtualization device of claim 15, wherein the virtualization engine is further programmed for:
dividing data associated with a first write operation to a first virtual address within a first of the plurality of virtual units into chunks; and
allocating a first set of data blocks in a first physical unit mapped to the first of the plurality of virtual units for each chunk.

17. The virtualization device of claim 16, further comprising a compression engine coupled to the virtualization engine for compressing each chunk before the allocating.

18. The virtualization device of claim 17, the virtualization engine is further programmed for:
dividing data associated with a second write operation to the first virtual address into chunks; and
allocating a second set of data blocks for each chunk from overflow reserve storage that is located within the first physical unit if the size of any compressed chunk associated with the second write operation exceeds the size of the previously allocated first set of data blocks.

19. The virtualization device of claim 18, wherein the overflow reserve storage is located within a page that also includes the first set of data blocks.

20. The virtualization device of claim 19, wherein the overflow reserve storage is located within a subpage of the page, wherein the subpage also includes the first set of data blocks.

21. The virtualization device of claim 17, wherein the virtualization engine is further programmed for:
allocating temporary data blocks associated with a third write operation to a third virtual address within the first virtual unit, wherein the address space in the first virtual unit associated with the third write operation includes pre-allocated chunks, wherein the third virtual address is unaligned with chunk boundaries of the pre-allocated chunks, and wherein the pre-allocated chunks are allocated a set of data blocks in a physical unit corresponding to the first virtual unit, the temporary data blocks being separate from the set of data blocks allocated to the pre-allocated chunks; and
overwriting the appropriate set of data blocks allocated to the pre-allocated chunks with data blocks from the temporary storage at a time after acknowledging completion of the third write operation.

22. The virtualization device of claim 21, wherein the overwriting comprises:
decompressing data blocks allocated to the pre-allocated chunks; and
replacing those decompressed data blocks allocated to the pre-allocated chunks that correspond to the virtual address space associated with the third write operation with data from the temporary data blocks.

23. The virtualization device of claim 15, further comprising a metadata engine coupled to the virtualization engine, the metadata engine programmed for:
maintaining a unit metadata data structure for each virtual unit for storing information describing mapping of the virtual unit to the physical unit and mapping of virtual addresses within the virtual unit to physical addresses in the physical unit.

24. The virtualization device of claim 23, wherein the metadata structure comprises a plurality of chunk structures, each chunk structure corresponding to a chunk in the virtual disk that has been allocated data blocks in the physical unit.

25. The virtualization device of claim 24, wherein each chunk structure includes a logical block address field indicating a physical address in the physical unit where the data associated with the chunk is stored, and a number of blocks field indicating the number of blocks allocated to the data associated with the chunk.

26. The virtualization device of claim 24, wherein the metadata structure further comprises a page header that includes a page index field identifying pages from the physical unit that have been allocated to the virtual unit and a per page block bitmap field identifying free and used data blocks within the pages from the physical unit.

27. The virtualization device of claim 15, wherein the virtualization engine comprises a deduplication engine programmed for:
dividing the data associated with a first write operation to a first virtual address in the virtual unit into chunks;
operating on at least one chunk to generate a signature associated with the at least one chunk;

comparing the signature associated with the at least one chunk with stored signatures of previously allocated chunks; and if a match is found, copying physical disk allocation information associated with the previously allocated chunk corresponding to the matched signature to physical disk allocation information associated with the at least one chunk.

28. The virtualization device of claim 27, wherein the deduplication engine is further programmed for:

incrementing a counter associated with the matched signature of the previously stored chunk.

\* \* \* \* \*